United States Patent Office 3,244,481
Patented Apr. 5, 1966

3,244,481
PROCESS FOR PREPARING FIBROUS TITANIUM DIOXIDE AND COMPOSITIONS USEFUL IN PRODUCTION THEREFOR
Kenneth Lester Berry, Hockessin, Del., assignor to E. I. du Pont de Nemours and Company, Wilmington, Del., a corporation of Delaware
No Drawing. Filed Oct. 5, 1964, Ser. No. 401,698
10 Claims. (Cl. 23—202)

This invention relates to inorganic fibrous materials, and more particularly to a method for preparing fibrous titanium dioxide and compositions containing titanium dioxide.

Titanium dioxide is well known as a white pigment and has been used extensively in this form. In addition, acicular forms such as those which produce asterism in synthetic sapphires and rubies have also been described. Recently, a fibrous form of titanium dioxide has been disclosed and several methods have been described for its production. Because of high refractiveness and reflectance for infrared radiation, this fibrous product is particularly useful as a high-temperature thermal insulator. Morever, because of its fibrous nature and high fluxural modulus, it is also adapted as a reinforcing component for plastics, ceramics, cremets, and in paper and other fiber compositions. It can be used as a filtering medium and is particularly useful in high-temperature applications. Because of these diverse uses, new methods for the preparation of this highly refractive fiber are desired.

Correspondingly, it is an object of this invention to provide a new method for preparing fibrous titanium dioxide. It is another object to provide a new method for preparing fibrous titanium dioxide of the rutile crystalline structure using a low viscosity melt, or matrix. Still another object is the provision of such a method that is adaptable for continuous operation. These and other objects will become apparent hereinafter.

This invention provides a novel process for the preparation of crystalline titanium dioxide fibers which comprises dissolving titanium dioxide, in a nonoxidizing atmosphere, to saturation in a melted matrix of cryolite and at least one other alkali metal cation-containing substance, said matrix having a freezing point below 825° C.; and cooling at least a portion of the melted titanium dioxide containing matrix to cause crystallization of titanium dioxide fibers. The crystalline fibrous titanium dioxide can then be separated from the cooled melt by conventional means. The homogeneous melt containing dissolved titanium dioxide from which fibrous crystalline titanium dioxide can be prepared, and the body obtained by cooling such melt, which consists of substantially pure crystalline fibers of titanium dioxide in the solidified matrix as defined above, are also features of this invention.

The alkali metal cation-containing substance may be any such substance since the nature of the anion is unimportant. Preferably, the substance is nonreactive with the cryolite and is a substance which is itself a solvent for titanium dioxide in the molten state. However, it is possible to employ substances reactive with cryolite provided they produce a melt having a freezing point below 825° C. For example, boric oxide and sodium borate react with cryolite to form a solid and a liquid phase at 825° C. After removing the solid phase, the remaining liquid phase provides a stable melt suitable for preparation of titanium dioxide fibers. Substances which may be employed in the matrix are alkali metal halides, such as fluorides, chlorides or bromides; alkali metal phosphates, such as lithium, sodium, potassium, rubidium and/or cesium mono- or poly-phosphates; potassium hexafluorotitanate; and alkali metal tetraborates, such as sodium, potassium, cesium or lithium, and boric oxide. Most preferably the substance is alkali metal halide, specifically sodium chloride or a mixture thereof with potassium chloride. The purity of the matrix ingredients should be at least equivalent to that of the commercially available materials.

The quantity of substance other than cryolite in the matrix should be sufficient to produce a melt having a freezing point below 825° C., and preferably between 700° and 825° C. Ordinarily, the cryolite content of the matrix will be not more than 50% (by weight), although larger proportions can be used in certain instances. In matrices containing metal chlorides the cryolite content usually will be in the range of 20–50%, and in those containing borax, in the range of 5–50%. Similar proportions of cryolite are employed in matrices prepared with other substances.

In carrying out the process of this invention, the amount of titanium dioxide dissolved in the melt is such that the melt will be saturated with titanium dioxide at a temperature between the freezing point of the melt and 825° C. If the melt becomes saturated with titanium dioxide at temperatures above 825° C., the titanium dioxide which precipitates will not have a fibrous structure. The titanium dioxide may be dissolved in the melt at any temperature, but the amount dissolved must be such that the melt will not become saturated until the temperature is at most 825° C. After dissolution the melt is then cooled to below 825° C. and until fibers of titanium dioxide form. The temperature to which the melt is cooled will range from the freezing point to 825° C.

Formation of fibrous titanium dioxide of the rutile crystalline structure occurs in the cooled melt, and the fibers may be removed therefrom by any convenient means, e.g., by filtration. The fibers so obtained can be freed from adhering melt components by washing with molten NaCl/KCl eutectic if desired, followed by washing with water or by extraction with acids. Alternatively, after fiber formation has reached the desired stage of completion, the entire fiber-containing matrix may be cooled to approximately room temperature and the fibers separated by extracting the matrix in water. As a final step, it is often advantageous to separate the fibrous product from any nonfibrous material remaining by filtration, screening, elutriation, decantation, or the like.

In a preferred embodiment, only a portion of the titanium dioxide-containing melt is cooled to produce a temperature gradient in the melt between a higher temperature zone and a lower temperature zone. These zones may be, for example, at 750–825° C. and 700–750° C., respectively, depending upon the freezing point of the matrix. The temperature gradient is preferably at least 10° C./cm. Titanium dioxide is continuously dissolved in the high-temperature zone and is convectively transported to the lower temperature zone where fibrous titanium dioxide is deposited by crystallization. The fibrous product is preferably removed by filtration to avoid the need for further cooling of the lower temperature zone.

As starting material, any form of titanium dioxide can be employed. Preferably a relatively pure nonfibrous titanium dioxide is used to avoid buildup of impurities in the molten matrix. Commercial pigmentary grades of titanium dioxide are entirely satisfactory. The starting material is desirably of small particle size to promote dissolution in the molten matrix. Any of the crystal forms of titanium dioxide, i.e., rutile, anatase, or brookite, or mixtures thereof can be used.

The process of this invention is usually carried out at atmospheric pressure, and provision of equipment capable of withstanding pressures greatly in excess of atmospheric is unnecessary. The pressures employed will usually be between 0.5 and 5 atmospheres.

To maintain a nonoxidizing atmosphere, the atmosphere is usually an inert gas. For example, a stream of nitrogen may be continuously passed over the reaction mixture.

In an alternative embodiment, the nonoxidizing atmosphere may contain superheated steam. The steam serves to promote formation of titanium dioxide fibers since it hydrolyzes the cryolite thus reducing the amount of cryolite present which in turn causes fibrous titanium dioxide to crystallize.

In batch operation, the time of reaction is not critical and may be varied within wide limits. The examples below illustrate processes carried out during periods ranging up to several hours. Although periods up to 10 hours or longer can be employed, it is usually preferable for economic reasons to employ shorter times. The process can also be operated in a continuous manner, fibrous product being continuously removed while starting material is continuously added to the melt.

For a clearer understanding of the invention, the following specific examples are given. These examples are intended to be merely illustrative of the invention and not in limitation thereof. Unless otherwise specified, all parts are by weight.

*Example I*

One gram of titanium dioxide powder was placed on the bottom of a 25-ml. platinum crucible and covered with 20 g. of KCl/NaCl eutectic which had previously been fused and cooled. Dry nitrogen was passed over the surface of the eutectic at a rate of 600 cc./min. and the crucible was heated. When the eutectic mixture had melted, a thermocouple was inserted in the melt and cryolite was added in increments until a total of 5.0 g. had been dissolved in the melt. The temperature at the bottom of the melt was 790° C. and at the top, 740° C. Fibrous crystals subsequently identified as titanium dioxide grew in the melt from the surfaces of the thermocouple and the wall of the crucible. Some of these fibers fell back continually to the bottom of the crucible. After one hour, heating was terminated and the melt was allowed to freeze. The solid cake was removed from the crucible and the bottom quarter cut off. The upper portion of the cake was leached in boiling water to remove soluble salts, and the residue was extracted with a boiling mixture of water and 37% hydrochloric acid in the proportions of 3:1. After decantation of the hot aqueous acid, the residual crystalline material comprised clusters of fibrous crystals. There were partially dispersed by shaking in water, and the dispersed fibers were collected by decanting the suspension through a 325-mesh (U.S. Standard sieve series) screen. The fibrous crystals so collected ranged up to 1.2 mm. in length. The finest appeared to be ribbons or laths about 1-2 microns wide. The X-ray diffraction pattern of these fibers corresponded to that of rutile titanium dioxide.

The lower portion of the product cake was extracted with water and acid, as described above, to a constant weight of 0.67 g. This comprised numerous fibrous crystals which had fallen from the walls, as well as pale blue, fine, prismatic crystals representing the residual starting material which apparently had undergone some heat maturing. It was estimated that roughly one-half of the original titanium dioxide had been recrystallized to fibrous forms.

*Example II*

A mixture of 225 g. KCl, 150 g. NaCl, and 125 g. cryolite was melted in a 500 cc. platinum dish having a flat bottom and vertical walls. The dish had an inverted funnel-shaped, loose fitting cover through which a thermocouple extended to the bottom center of the melt, and through which dry nitrogen was passed at a rate of 500 cc./min. Titanium dioxide was added to the melt in approximately 5-g. portions to maintain a continuous supply of this solid on the bottom of the melt. The bottom center of the melt was maintained at 770–810° C. and the top of the melt adjacent to the wall was at 700–720° C. Fibrous crystals grew on the wall of the latter zone. Strong convection currents were observed in the melt and some of the titanium dioxide circulated rapidly in the melt. A portion of this was in the form of clusters, about 250 microns in diameter, of fibers 1–2 microns in width extending densely in a tangled radial array from a central nucleus. After 2.25 hours, the melt was poured out of the dish leaving behind the fibrous wall growth and residual supply titanium dioxide on the bottom. The wall deposit was extracted with boiling water and dried to obtain 8.2 g. of a mixture containing titanium dioxide fibers and matrix constituents. In order to remove the latter, a portion of the mixture was washed twice by decantation with molten KCl/NaCl eutectic. This treatment left a crystalline solid containing fibers which averaged about 50 microns in length and about 1–2 microns in width.

*Example III*

A mixture of 16 g. sodium tetraborate, 4 g. cryolite, and 1 g. boric oxide was fused and maintained at about 800° C. while titanium dioxide was added in small increments. The mixture was stirred after each addition. When 2.9 g. of titanium dioxide had been added, the melt appeared to be saturated therewith and deposited acicular crystals when cooled rapidly and held at 750° C. When the melt was cooled rapidly to room temperature, a bluish opalescent glass resulted in which the solid phase as colloidal. This glass was remelted to a clear liquid by heating to 900° C. and cooled at a rate such that furnace temperatures at successive 15-minute intervals through the crystallization range was 820°, 750°, 710°, and 680° C. The product was a composite of blue and colorless needles and fibers in a glassy matrix. Extraction of the product with water and dilute hydrochloric acid left 1.91 g. of acicular and fibrous titanium dioxide.

*Example IV*

A mixture (124.7 g.) obtained by milling 44.5 g. of potassium chloride, 29.5 g. sodium chloride, 25 g. cryolite and 25 g. titanium dioxide with glass balls overnight was placed in a 300-ml. flat-bottomed platinum dish. The dish was placed into a furnace heated to 600° C. and held under a flow of dry nitrogen at 500 ml. per minute while the temperature was raised rapidly to 700° C . The mixture became a soft yellow mush of molten and solid phases. After one hour at 700° C., during which the mixture showed no formation of fibrous crystals, the furnace was heated to 740° C. After four hours at this temperature, only a trace of short fibers was detected in the surface of the semi-molten mixture. Superheated steam was then introduced into the nitrogen flow, and thereafter a relatively rapid formation of fibrous crystals was observed. The process was terminated after 18.5 hours of steam treatment, when a large fraction of the solid phase in the surface of the reaction mixture was observed to be fibrous. The cooled product was mixed with water, and the resultant suspension of fine insoluble material was decanted into a filter consisting of a 100-mesh screen. The screen retained a mat of titanium dioxide crystals comprising a mixture of smooth fibers having a range of dimensions averaging about $5 \times 60\mu$, monocrystalline fibers having cross-sections in the range of $2-10\mu$ and lengths up to about 2 mm., and rough tetragonal polycrystalline needles.

The new process of this invention utilizes readily available and economical ingredients to produce fibrous titanium dioxide. As previously stated, the fibrous product is useful in thermal insulation and as plastic reinforcement agents.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing fibrous titanium dioxide which comprises dissolving in a nonoxidizing atmosphere titanium dioxide in a matrix of cryolite and at least one alkali metal-containing substance, said matrix having a freezing point below 825° C., said titanium dioxide being present in an amount to saturate said matrix when said matrix has a temperature between its freezing point and 825° C., and cooling at least a portion of the melted titanium dioxide-containing matrix to cause crystallization of fibrous titanium dioxide in said portion.

2. The process of claim 1 wherein the temperature at which the matrix becomes saturated with titanium dioxide is between 775 and 825° C., and the freezing point of the matrix is between 700 and 750° C.

3. The process of claim 1 wherein said process is carried out continuously by cooling a portion of said titanium dioxide-containing melt, removing fibrous titanium dioxide therefrom, and adding titanium dioxide to maintain saturation of the uncooled portion of the melt.

4. The process of claim 1 wherein the matrix comprises cryolite and an alkali metal halide.

5. The process of claim 1 wherein the matrix comprises cryolite and the liquid reaction product of cryolite and sodium borate at 825° C.

6. The process of claim 1 wherein the matrix comprises cryolite, sodium chloride and potassium chloride.

7. The process of claim 1 wherein the matrix comprises cryolite and sodium chloride.

8. The process of claim 1 wherein superheated steam is introduced during the cooling step.

9. A composition comprising titanium dioxide dissolved in a molten matrix of cryolite and at least one alkali metal cation-containing substance, said matrix having a freezing point below 825° C.

10. A composition comprising fibrous titanium dioxide in a solid matrix of cryolite and at least one alkali metal cation-containing substance, said matrix having a freezing point below 825° C.

References Cited by the Examiner
UNITED STATES PATENTS

| | | | |
|---|---|---|---|
| 2,980,510 | 4/1961 | Berry | 23—202 |
| 3,012,857 | 12/1961 | Pease | 23—202 |
| 3,030,183 | 4/1962 | Berry | 23—113 |
| 3,065,091 | 11/1962 | Russell et al. | 106—57 |

OTHER REFERENCES

Compt. rend. 238, 914–916 (1954).

MAURICE A. BRINDISI, *Primary Examiner.*